(12) United States Patent
Herbst et al.

(10) Patent No.: US 7,062,459 B1
(45) Date of Patent: Jun. 13, 2006

(54) DIGITAL COMPUTER SYSTEM AND METHODS FOR MANAGING A SYNTHETIC INDEX FUND

(75) Inventors: Anthony F. Herbst, El Paso, TX (US); Wayne F. Perg, Amado, AZ (US)

(73) Assignee: New Market Solutions, LLC, Phoenix, AZ (US)

( * ) Notice: Subject to any disclaimer, the term of this patent is extended or adjusted under 35 U.S.C. 154(b) by 711 days.

(21) Appl. No.: 09/280,244

(22) Filed: Mar. 29, 1999

(51) Int. Cl.
*G06F 17/60* (2006.01)

(52) U.S. Cl. .............................. 705/37; 705/31; 705/36; 705/30; 705/35

(58) Field of Classification Search ................. 705/36, 705/37
See application file for complete search history.

(56) References Cited

U.S. PATENT DOCUMENTS

| | | | | |
|---|---|---|---|---|
| 4,674,044 A | | 6/1987 | Kalmus et al. ............. 364/408 |
| 5,126,936 A | * | 6/1992 | Champion et al. ......... 364/408 |
| 5,148,365 A | * | 9/1992 | Dembo ....................... 364/402 |
| 5,227,967 A | * | 7/1993 | Bailey ........................ 364/408 |
| 5,557,517 A | * | 9/1996 | Daughterty, III ........... 364/408 |
| 5,799,287 A | * | 8/1998 | Dembo ....................... 705/36 |
| 5,806,048 A | * | 9/1998 | Kiron et al. ................ 705/36 |
| 5,819,238 A | * | 10/1998 | Fernholz .................... 705/36 |
| 5,857,176 A | | 1/1999 | Ginsberg .................... 705/36 |
| 5,870,720 A | | 2/1999 | Chusid et al. .............. 705/38 |
| 5,875,437 A | | 2/1999 | Atkins ........................ 705/40 |
| 5,946,667 A | | 8/1999 | Tull, Jr. et al. ............ 705/36 |
| 6,014,643 A | * | 1/2000 | Minton ....................... 705/37 |
| 6,016,483 A | * | 1/2000 | Rickard et al. ............. 705/37 |
| 6,018,722 A | * | 1/2000 | Ray et al. .................. 705/36 |
| 6,021,397 A | | 2/2000 | Jones et al. ................ 705/36 |
| 6,035,287 A | | 3/2000 | Stallaert et al. ............ 705/37 |
| 6,049,783 A | * | 4/2000 | Segal et al. ................. 705/37 |
| 6,064,985 A | * | 5/2000 | Anderson ................... 705/36 |
| 6,161,098 A | * | 12/2000 | Wallman .................... 705/36 |

OTHER PUBLICATIONS

The Wall Street Journal; 'Synthetic' Stock; Future Stand–in for the Real Thing, Oct. 1990.*

(Continued)

*Primary Examiner*—Yehdega Retta
(74) *Attorney, Agent, or Firm*—Peter K. Trzyna, Esq.

(57) ABSTRACT

A computer-aided method for implementing at least one synthetic stock investment fund. The method includes providing a digital electrical computer apparatus including a digital computer having a processor, the processor electrically connected to a memory device for storing and retrieving machine-readable signals, to an input device for converting information into input electrical data, and to an output device for converting output electrical data into print, the processor programmed to control the apparatus to receive the input data and to produce the output data by steps including: forming a synthetic index investment fund owned by an entity, the synthetic index investment fund forming including entering data representing an amount of an interest-bearing asset and entering data representing an amount of a stock-related instrument defined by a mathematical relationship to the interest-bearing asset; and balancing the amount of the interest-bearing asset and the amount of the stock-related instrument to maintain the mathematical relationship in response to input market price data corresponding to at least one member of the group consisting of the interest-bearing asset and the stock-related instrument; calculating respective unit values for shares in the fund in response to the input market price data; inputting trade data to facilitate trading shares in the fund; accounting for the trading, for changes in the market price data for the interest-bearing asset, and for the amount of the stock-related instrument, and for transactions involving the interest-bearing asset and transactions involving the stock-related asset; and generating share price data and holding data as the output for investor reporting.

38 Claims, 7 Drawing Sheets

OTHER PUBLICATIONS

RiskWatch, http://www.algorithmics.com/products/riskwatch1.html.*

Steering clear of derivatives risk, TMA Journal; Atlanta; Sep./Oct. 1995; Chung, Ronald; Fung, Hung–Gay; proquest.umi.com/.*

Mutual funds: Ranking the funds, Financial World; New York; Mar. 18, 1997; Badenhouser, Kurt; proquest.umi.com.*

Asset Management; ICB Magazine; London; Nov./Dec. 1994; Kirby, Anthony. Proquest.umi.com.*

Herbst, Anthony F. and Nicholas O. Ordway. "Stock Index Futures Contracts and Separability of Returns." *The Journal of Futures Markets*, vol. 4, No. 1, pp. 87–102 (1984).

Hill, Joanne M. and Humza Naviwala. "Synthetic and Enhanced Index Strategies Using Futures on U.S. Indexes." *The Journal of Portfolio Management*, May 1999, pp. 61–74.

McGinn, Daniel. "The Ultimate Guide to Indexing." *Bloomberg*, Sep. 1999, pp. 66–83.

Miller, Todd and Timothy S. Meckel. "Beating Index Funds with Derivatives." *The Journal of Portfolio Management*, May 1999, pp. 75–87.

PIMCO Funds. "PMCO Stocks Plus Fund." (Aug. 19, 1999) 12 Pages, http://www.pimcofunds.com.

Herbst, Anthony F., Joseph P. McCormack, Elizabeth N. West. "Investigation of Lead–Lag Relationship between Spot Stock Indices and Their Futures Contracts." *The Journal of Futures Markets*, vol. 7, No. 4, pp. 373–381, (1987).

* cited by examiner

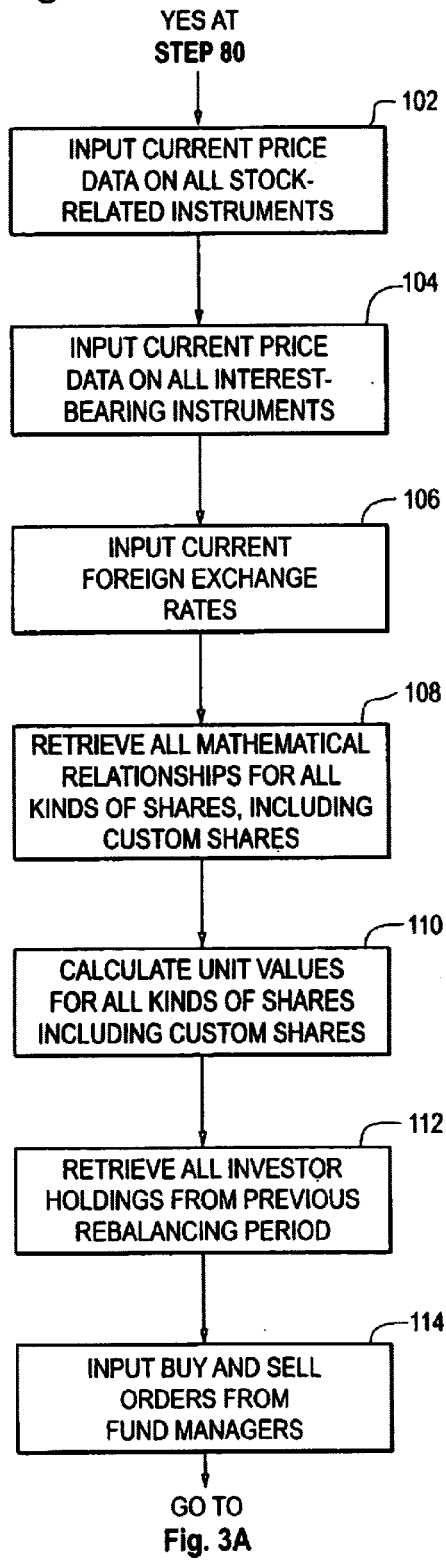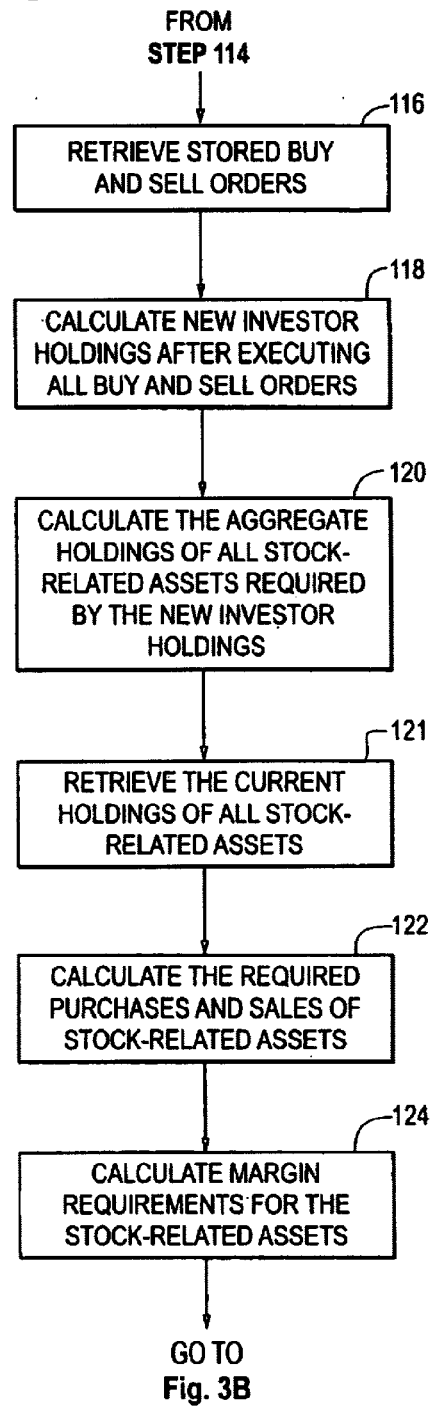

DIGITAL COMPUTER SYSTEM AND METHODS FOR MANAGING A SYNTHETIC INDEX FUND

I. FIELD OF THE INVENTION

The present invention pertains to an electrical digital computer machine and a data processing system, methods involving the same and products produced thereby, as well as data structures and articles of manufacture pertaining thereto, pertaining to computerized aspects of financial fields of operating and managing a synthetic index fund, creating and servicing shares in the synthetic index fund, securities exchanges, exchange trading and financial markets. More particularly, this invention relates to a digital electrical data processing system for a process for operating and managing a synthetic index fund, including the creation and servicing of one or more kinds of shares in the synthetic index fund.

Even more particularly, this invention finds utility extending at least to the following: (1) operating and managing an investment fund; (2) trading, matching, bidding or hedging; (3) credit (risk) processing and credit transactions; (4) associated document generating; and further to (5) point of sale terminal activity, and (6) having security or user identification provision (password entry, etc.); as well as (7) price determination; (8) interconnecting terminals; (9) inventory monitoring; (10) electronic shopping; (11) inventory management; (12) accounting, (13) such as bill or statement preparation.

II. BACKGROUND OF THE INVENTION

Present stock index funds suffer from significant transactions costs because of their need to constantly adjust their holdings of a large number of stocks in order to maintain a portfolio that accurately reflects the performance of the stock index that the fund managers are attempting replicate with their investment fund. In an attempt to reduce these costs, fund managers have developed "tracking portfolios" that contain fewer stocks than the index but have, in the past, tracked the performance of the desired index within certain margins.

The use of tracking portfolios reduces the number of stocks that must be traded, thus reducing transactions costs. However, differences between the tracking portfolio and the specified index may cause the performance of the index fund to deviate somewhat from the index that the fund is seeking to track and the past performance of tracking portfolio relative to the index does not guarantee its future performance. Also, the tracking portfolios still contain large numbers of stocks (although significantly less than the number of stocks in the index) and, as a result, transactions costs remain significant.

Another problem with present index funds, for taxable investors, is the creation of unrealized capital gains that may build up in large amounts before being realized as a result of the transactions required to track the index. Investors in the fund do not know the amount or the timing of the capital gains that may result from the realization of these embedded capital gains as a result of the transactions necessary to track the index. Changes in the makeup of the index (e.g., as a result of merger activity) and/or changes in relative prices of stocks within the index may trigger the realization of large amounts of embedded gains.

In addition to making tax planning difficult for taxable investors, the realization of these embedded gains can create tax liabilities for gains that actually occurred before the investor purchased the fund, thus causing the investor to owe tax on gains that the investor earned. The investor ends up owing tax on "phantom" gains because the investor paid a price for the shares of the fund that included the embedded gains that were realized.

The emergence of deep, liquid markets for futures and options on popular stock indexes has made it possible to develop synthetic index funds that can overcome the problems of high transactions costs, the imperfections of tracking portfolios, the uncertain timing of taxable capital gains and the problem "phantom" capital gains. One of the inventors of the present invention, Anthony F. Herbst, has published academic research (Herbst, Anthony F., and N. Ordway, "Stock Index Futures and the Separability of Returns," *The Journal of Futures Markets*, Vol. 4, No. 1, Spring 1984, pp. 87–102) that investigates the performance of stock index futures. This research does not discuss the creation of synthetic index funds but it does provide a foundation for establishing the expected performance of such a fund.

The transactions cost of operating an index fund can be greatly reduced by the use of index futures and/or options in order to create a synthetic index fund. At the same time the accuracy with which the fund tracks the index will be increased because the value of each index future or option is based upon the entire index portfolio, not some "tracking" portfolio whose performance may diverge from the performance of the index.

The use of index futures and/or options can also speed the adjustment of the fund to the index because rebalancing can be accomplished with a single transaction. As a result of the lower cost and greater speed of rebalancing, the frequency of rebalancing can be increased, further increasing the accuracy with which the fund tracks the index. More frequent rebalancing will also mean more frequent trading opportunities for investors who might choose to use investments in the fund as a cost-effective way of carrying out an investment strategy based on timing fluctuations in the index.

As a result of lower operating costs and more accurate tracking of the index, the synthetic index fund will be able to more closely duplicate the investment performance of the underlying index than is possible with a traditional index fund. In addition, the synthetic index fund virtually eliminates the problem of embedded gains, thus improving tax planning for taxable investors and virtually eliminating the problem of taxable investors owing tax on what are phantom gains for the investor.

An additional benefit of the synthetic index fund is that investors will earn a current cash return equal to the interest rate on a selected portfolio of interest-bearing securities (some part of which may be required to be Treasury Bills in order to meet margin requirements) rather than the current dividend yield on the stocks in the index. Because interest rates have generally exceeded dividend yields on stocks in recent decades, the excess of the interest return over the dividend yield on the stocks in the index may make it possible for investors in the synthetic index fund to earn a return greater than the return on the index—with no increase in risk.

In addition to improved investment performance relative to present index funds, the synthetic index fund can be modified to offer investors options that are not available with present index funds. The options which might be offered to an investor, all of which could be efficiently offered by a single fund, include: 1) the choice of multiple kinds of shares involving different stock-related assets and/or different interest-bearing assets, including foreign stock-related assets and/or interest bearing assets; 2) the choice of different kinds of shares offering varying degrees of leverage for the stock-related asset; 3) the option of different kinds of shares that include the option of going short the stock-related asset; 4) the option to switch among various kinds of shares quickly and at a low cost; 5) the option of the investor custom creating his or her own variety of share and varying the nature of this custom share over time; and, 6) the option to invest in one or more varieties of shares managed by professional managers.

III. SUMMARY OF THE INVENTION

In view of the foregoing, it is an object of the present invention to provide a computer-aided method for implementing at least one synthetic stock investment fund.

It is another object of the present invention to provide a digital electrical computer apparatus including a digital computer having a processor, the processor electrically connected to a memory device for storing and retrieving machine-readable signals, to an input device for converting information into input electrical data, and to an output device for converting output electrical data into print, the processor programmed to control the apparatus to receive the input data and to produce the output data.

It is yet a further object of the present invention to form a synthetic index investment fund owned by an entity, the synthetic index investment fund forming including entering data representing an amount of an interest-bearing asset and entering data representing an amount of a stock-related instrument defined by a mathematical relationship to the interest-bearing asset.

It is yet an additional object of the present invention to balance the amount of the interest-bearing asset and the amount of the stock-related instrument to maintain the mathematical relationship in response to input market price data corresponding to at least one member of the group consisting of the interest-bearing asset and the stock-related instrument.

It is still an additional object of the present invention to calculate respective unit values for shares in the fund in response to the input market price data.

It is still another object of the present invention to input trade data to facilitate trading shares in the fund.

It is yet still another object of the present invention to account for the trading, for changes in the market price data for the interest-bearing asset, and for the amount of the stock-related instrument, and for transactions involving the interest-bearing asset and transactions involving the stock-related asset.

It is moreover another object of the present invention to generate share price data and holding data as the output for investor reporting.

It is additionally still another object of the present invention to account for trading wherein the step of accounting for trading includes the steps of: retrieving investor holdings prior to a purchase of the shares; and generating output representing the investor holdings adjusted for a purchase of the shares.

It is additionally still another object of the present invention to provide that the step of balancing is triggered periodically.

It is additionally still another object of the present invention to provide an alternate embodiment in wherein the step of balancing includes balancing the amount of a non-United States debt instrument as the interest-bearing asset.

It is even more an object of the present invention to provide an alternate embodiment wherein the step of balancing includes balancing the amount of a government debt instrument as the interest-bearing asset.

It is even moreover an object of the present invention to provide an alternate embodiment wherein the step of balancing includes balancing the amount of a non-United States stock-related instrument as the stock-related instrument.

Furthermore, it is even moreover an object of the present invention to provide an alternate embodiment wherein the step of balancing includes balancing the amount of at least one member of the group consisting of a stock option and a stock index option as the stock-related instrument.

It is yet still another object of the present invention to provide an alternate embodiment wherein the step of balancing includes balancing the amount of a stock index future as the stock-related instrument.

It is moreover another object of the present invention to provide an alternate embodiment wherein the step of balancing includes balancing the amount of a swap as the interest-bearing asset.

It is additionally still another object of the present invention to provide an embodiment that includes the step of adjusting, with said apparatus, the mathematical relationship in response to changed market conditions.

It is additionally still another object of the present invention to provide an alternate embodiment wherein the step of accounting includes calculating margin requirements and allocating funds for margin calls.

It is additionally still another object of the present invention to provide an alternate embodiment wherein the step of calculating includes calculating an amount of liquid funds to hold in reserve for the margin calls.

It is even more an object of the present invention to provide an alternate embodiment wherein the step of balancing includes adjusting futures contract holdings to reflect net redemptions of shares.

It is even moreover an object of the present invention to provide an alternate embodiment wherein the step of forming is carried out with at least some data representing foreign currency.

It is yet still another object of the present invention to provide an embodiment wherein the shares include at least two different kinds of the shares.

It is yet still another object of the present invention to provide an alternate embodiment wherein the shares include at least two different kinds of the shares, the kinds reflecting a difference in type of the interest-bearing asset.

It is yet still another object of the present invention to provide an alternate embodiment wherein the shares include at least two different kinds of the shares, the kinds reflecting a difference in type of the stock-related asset.

It is yet still another object of the present invention to provide an alternate embodiment wherein the shares include at least two different kinds of the shares, the kinds reflecting a difference in the mathematical relationship for each of the kinds.

It is moreover an object of the invention to provide an alternate embodiment wherein the shares include customizable kinds of the shares, the customizable kinds of shares defined from at least one member of a group consisting of the amount of the interest-bearing asset, the amount of the stock-related asset, and the mathematical relationship.

It is additionally still another object of the present invention to provide an alternate embodiment that includes the step of managing at least one of said synthetic index investment funds, including managing short positions, with said apparatus.

It is even more an object of the present invention to provide an alternate embodiment that includes the step of managing at least one of said synthetic index investment funds, including managing long positions.

It is even moreover an object of the present invention to provide an alternate embodiment wherein the steps of managing include calculating, with said apparatus, margin requirements on combined long and short positions.

Furthermore, it is even moreover an object of the present invention to provide an alternate embodiment wherein the step of balancing includes maintaining a constant weighted-average maturity for the stock-related instrument.

It is additionally still another object of the present invention to provide a trading digital electrical computer apparatus including a trading digital computer having a trading processor, the trading processor electrically connected to a trading memory device for storing and retrieving machine-readable signals, to a trading input device for receiving trading input data and converting the trading input data into trading input electrical data, and to a trading output device for converting trading output electrical data into trading output having a trading visual presentation, the trading processor being controlled by a trading program to form trading circuitry in the trading processor for controlling the trading apparatus to receive the trading input data and to produce the trading output data; inputting, as a portion of the trading input data, purchase orders and sell orders for at least one from a group consisting of an interest-bearing asset and a stock-related instrument; computing a price for the asset; and generating output including trade confirmation documentation, including the price, for any trade of the asset.

It is even more an object of the present invention to provide a broker's digital electrical computer apparatus including a broker's digital computer having a broker's processor, the broker's processor electrically connected to a broker's memory device for storing and retrieving machine-readable signals, to a broker's input device for receiving broker's input data and converting the broker's input data into broker's input electrical data, and to a broker's output device for converting broker's output electrical data into broker's output having a broker's visual presentation, the broker's processor being controlled by a broker's program to form broker's circuitry in the broker's processor for controlling the broker's apparatus to receive the broker's input data and to produce the broker's output data; inputting, as a portion of the broker's input data, respective purchase orders and sell orders for investments including at least one from a group consisting of interest-bearing assets and stock-related instruments; generating output including trade confirmation documentation, including a price, for any trade of the investment.

It is even moreover an object of the present invention to provide a share owner's digital electrical computer apparatus including a share owner's digital computer having a securities owner's processor, the share owner's processor electrically connected to a share owner's memory device for storing and retrieving machine-readable signals, to a share owner's input device for receiving share owner's input data and converting the share owner's input data into share owner's input electrical data, and to a share owner's output device for converting share owner's output electrical data into share owner's output having a share owner's visual presentation, the share owner's processor being controlled by a share owner's program to form share owner's circuitry in the share owner's processor for controlling the share owner's apparatus to receive the share owner's input data and to produce the share owner's output data; inputting, as a portion of the share owner's input data, a definition for each share, the definition including at least one from a group consisting of the interest bearing asset, the stock-related instrument and the mathematical relationship between the two; inputting, as a further portion of the share owner's input data, a price for the share; and generating output including the price and a share value.

Furthermore, it is even moreover an object of the present invention to provide a reporting digital electrical computer apparatus including a reporting digital computer having a reporting processor, the reporting processor electrically connected to a reporting memory device for storing and retrieving machine-readable signals, to a reporting input device for receiving reporting input data and converting the reporting input data into reporting input electrical data, and to a reporting output device for converting reporting output electrical data into reporting output having a reporting visual presentation, the reporting processor being controlled by a reporting program to form reporting circuitry in the reporting processor for controlling the reporting apparatus to receive the reporting input data and to produce the reporting output data; inputting, as a portion of the reporting input data, information output by at least one of said output data for a share; generating, from the reporting input data, a reformatted version of the reporting input data; communicating, by digital means, a transmission of the reformatted version of the reporting input data; and generating output at a recipient receiver device, the output including the reformatted version of the reporting input data.

The inventors herein have sought to attain these and other objects evident herein as making matters better by providing a modern automated data processing system to create synthetic index funds that, as compared to present stock index funds: 1) reduces the transactions expenses required to operate the fund; 2) improves the tracking of the specified index; 3) virtually eliminates the embedded capital gains that can create problems of tax timing and "phantom" taxable gains for taxable investors; and, 4) may create further gains to investors by paying the investors a current interest return that generally exceeds the dividend yield paid by present stock index funds.

The inventors have developed a further improvement in the accuracy with which the synthetic index fund can track the specified index. This is accomplished by periodically adjusting the holdings of different maturities of the stock-related instrument so as to maintain a constant weighted-average maturity for the stock-related instrument. Maintaining a constant weighted-average maturity reduces the basis risk of the stock-related instrument, thus further increasing the accuracy with which the fund tracks the specified index.

In addition to the above improvements in performance relative to present stock index funds, the synthetic index fund can be modified to offer investors options that are not available with present index funds. The options which might be offered to an investor, all of which could be efficiently offered by a single fund, include: 1) the choice of multiple kinds of shares involving different stock-related assets and/or different interest-bearing assets, including foreign stock-related assets and/or interest bearing assets; 2) the choice of different kinds of shares offering varying degrees of leverage for the stock-related asset; 3) the option of different kinds of shares that include the option of going short the stock-related asset; 4) the option to switch among various kinds of shares quickly and at a low cost; 5) the option of the investor custom creating his or her own variety of share and varying the nature of this custom share over time; and, 6) the option to invest in one or more varieties of shares managed by professional managers.

With regard to the expanded options made possible by the present invention, the inventors mean to define the term "stock-related asset" broadly to include any instrument whose price depends on the price of another asset including, but not limited to, all commodity futures and options as well as all financial futures and options.

When the present invention is applied to these expanded options, the fund created by the invention may be something other than a synthetic index fund. For example, when applied to commodities and/or interest rate futures, the invention may be used to create a hedging fund that offers increased flexibility and reduced basis risk to hedgers seeking to manage their risks. The increased flexibility results from the ability to invest in fractional contracts. The reduced basis risk results from the ability of the fund to maintain a constant weighted average maturity for the futures.

The synthetic index fund may be structured, depending upon current financial regulations, as a mutual fund, a commodities fund, a limited liability company, a limited partnership, a trust fund or any other structure that is consistent with the operation of the fund.

Generally, to meet these and the other objects of the present invention apparent from improving over the prior state of affairs, we have invented a computer system and methods for managing a synthetic index fund. The data processing system includes a programmed electrical digital computer having a processor electrically connected to an input device and to an output device. The data processing system manages a synthetic index investment fund owned by an entity, including: entering data representing an amount of an interest-bearing asset and entering data representing an amount of a stock-related instrument defined by a mathematical relationship to the interest-bearing asset; and balancing the amount of the interest-bearing asset and the amount of the stock-related instrument to maintain the mathematical relationship in response to input market price data corresponding to at least one member of the group consisting of the interest-bearing asset and the stock-related instrument; calculating respective unit values for shares in the fund in response to the input market price data; inputting trade data to facilitate trading shares in the fund; accounting for the trading, for changes in the market price data for the interest-bearing asset, and for the amount of the stock-related instrument, and for transactions involving the interest-bearing asset and transactions involving the stock-related asset; and generating share price data and holding data as the output for investor reporting.

IV. BRIEF DESCRIPTION OF THE DRAWINGS

FIG. 3 is an illustration of a flow chart for an embodiment of the present invention;

FIG. 3A is an illustration of a flow chart for an embodiment of the present invention;

V. DETAILED DESCRIPTION OF A PREFERRED EMBODIMENT

The inventors have provided the present invention to facilitate lowering the operating costs of the fund, improving the accuracy of tracking the desired index, improve tax planning and virtually eliminate the problem of "phantom" gains for taxable investors, and increasing the current income yield.

In addition, the preferred embodiment described herein offers investors options that are not available from present index funds. The options offered by this preferred embodiment include: 1) the choice of multiple kinds of shares involving different stock-related assets and/or different interest-bearing assets, including foreign stock-related assets and/or interest bearing assets; 2) the choice of different kinds of shares offering varying degrees of leverage for the stock-related asset; 3) the option of different kinds of shares that include the option of going short the stock-related asset; 4) the option to switch among various kinds of shares quickly and at a low cost; 5) the option of the investor custom creating his or her own variety of share and varying the nature of this custom share over time; and, 6) the option to invest in one or more varieties of shares managed by professional managers.

Figure 1:
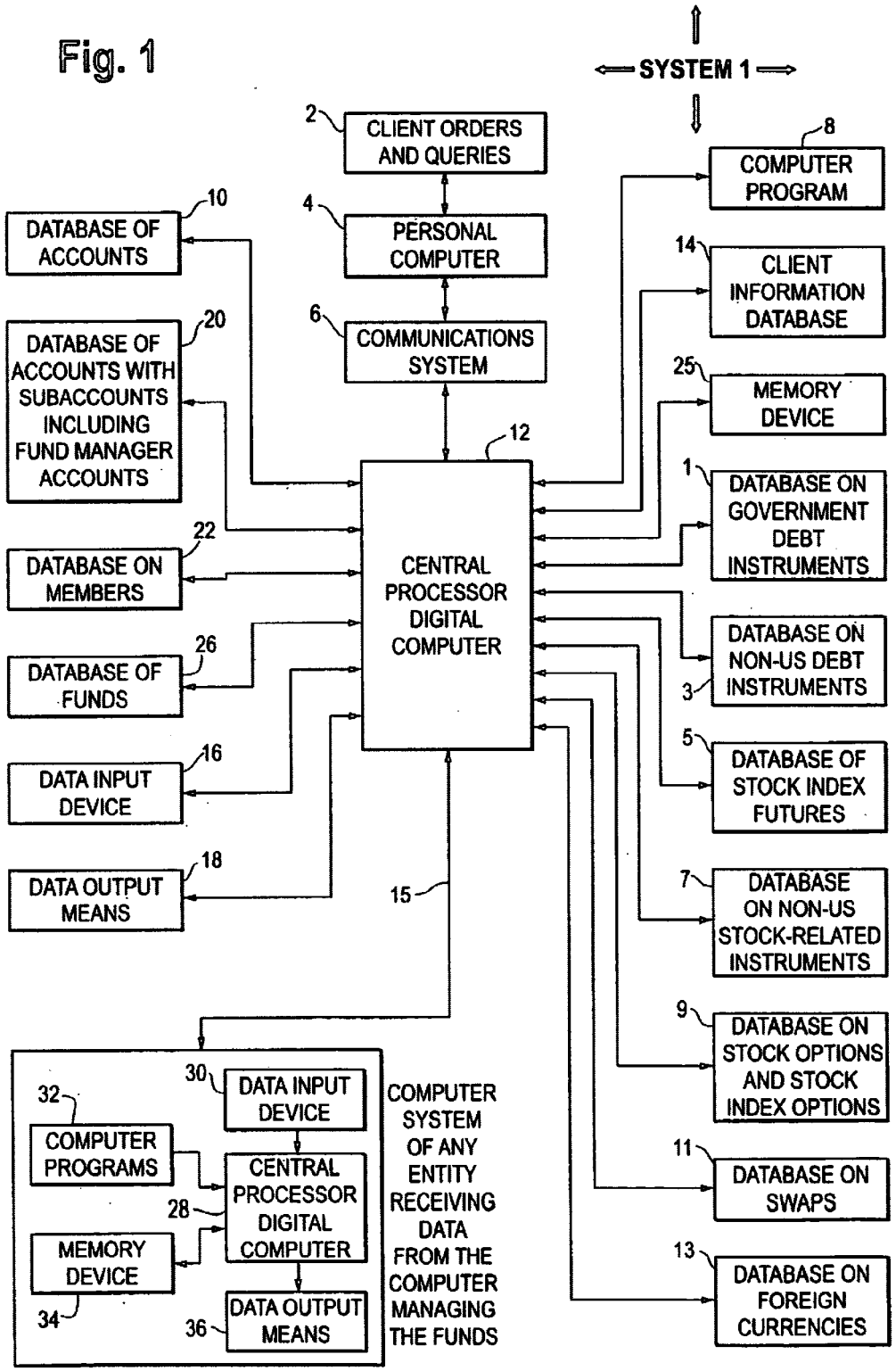
FIG. 1 is an illustration of an embodiment of the present invention.

Referring now to FIG. 1, an embodiment of the present invention is illustrated so as to indicate how to make and use the synthetic index fund system 1. At the heart of the invention is at least one digital computer 12, such as a server in a distributed network. The digital electrical computer 12 has a memory device for storing electronic output 24, such as a hard drive, diskette and disk drive, etc. The digital electrical computer 12 is connected to a communications system 6, such as the Internet, by such means as a modem. Terminals 4, such as PCs or dumb terminals can link to the communications system 6 to communicate with the digital electrical computer 12. Additionally, the digital electrical computer 12 is connected to a data input device 16, such as a keyboard, and data output means 18, such as a printer and/or monitor. The digital electrical computer 12 is controlled by a computer program 8.

Note that the computer program 8 is preferably in software, but can alternatively be wholly or partially in hardware. A software approach, e.g., the program stored on a diskette article of manufacture, provides a useful facility for inputting or storing data structures that are produced by the computer program 8, as well as for inputting a software embodiment of the present invention. Of course, storing the computer program 8 in a software medium is optional because the same result can be obtained by replacing the computer program 8 in a software medium with the computer program 8 in a hardware storage device, e.g., by burning the computer program 8 into a ROM, using conventional techniques to convert software into an ASIC or FPGA, etc., as would be readily understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R.

Goodman, Todd I. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" can include inputting data for processing by the computer program 8 or inputting in the computer program 8 code itself. The software embodiment is preferable for flexibility, but these approaches are equivalent.

The computer program 8 facilitates accessing as well as using a database of accounts 10; a database of accounts with sub-accounts, including fund manager accounts 20; a database on members 22; a database of funds 26; a client information database 14; a database on government debt instruments 1; a database on non-US debt instruments 3; a database of stock-index options 5; a database of non-US stock-related instruments 7; a database of stock options and stock index options 9; a database of swaps 11; and a database of foreign currencies 13.

The computer program 8 facilitates accessing as well as processing client orders and queries 2.

A second digital computer 28 with a central processor, memory device 34, input device 30, and output device 36 may be connected to the first digital computer 12. This second digital computer 28 is controlled by a second computer program 32. This second digital computer 28 obtains data 15 from the first digital computer 2.

Figure 2:
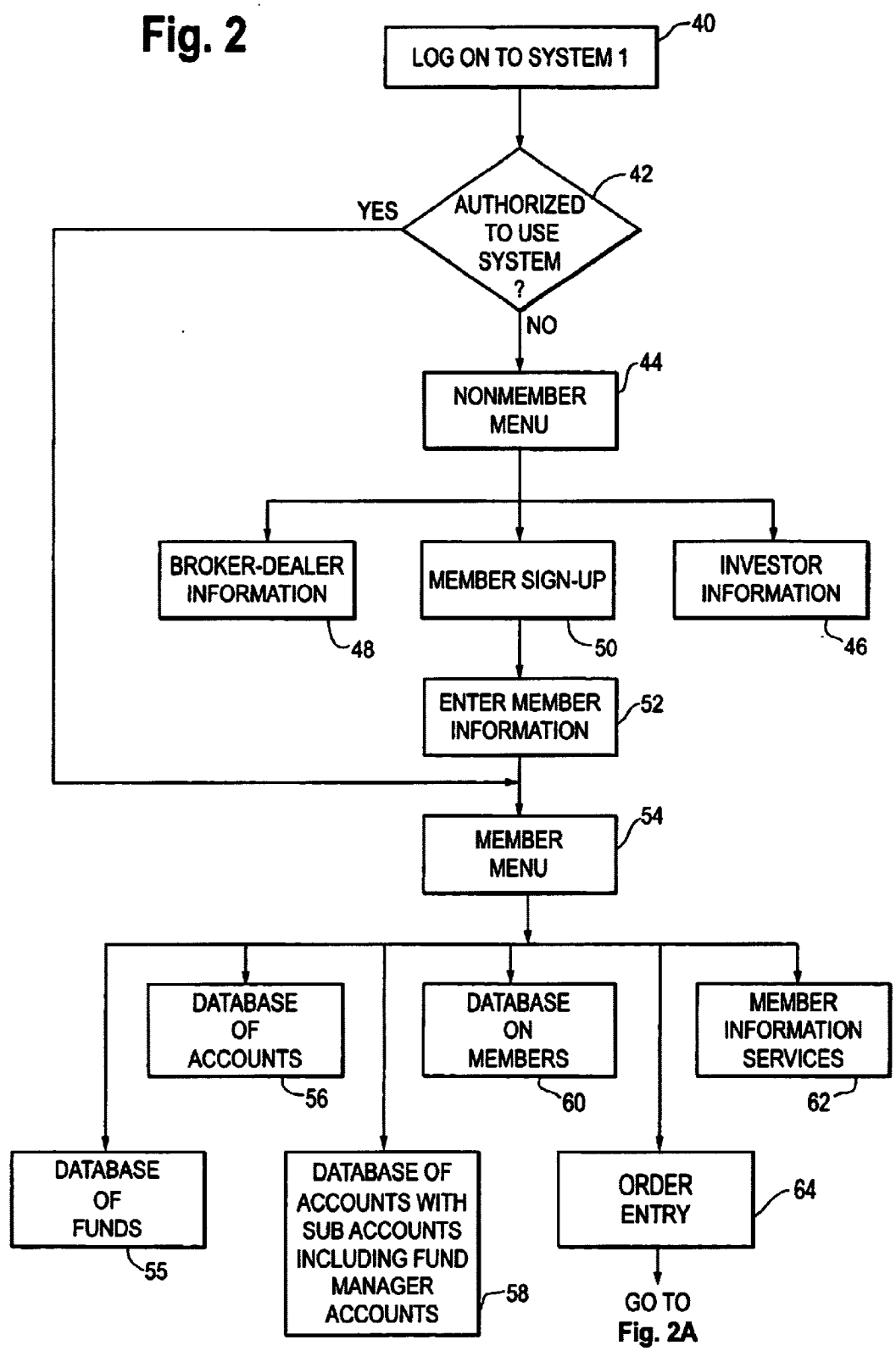
FIG. 2 is an illustration of a flow chart for an embodiment of the present invention.

Referring now to FIG. 2, clients of the synthetic index fund first log on 40 to the system 1. The system 1 then checks 42 whether or not the client is authorized to use the fund. If the client is not authorized to use the fund, the client is referred to a non member menu 44. The non member menu 44 will allow the client to access investor information 46, broker-dealer information 48, and information on member sign-up 50. Upon signing up as a member, the client enters 52 member information and then is referred to a member menu 54.

If the client is authorized user, the client is referred to a member menu 54. One choice is to access a database 55 of funds. A second choice is to access a database 56 of accounts. A third choice is to access a database 58 of accounts with sub-accounts, including fund manager accounts. A fourth choice is to access a database 60 on members. A fifth choice is to access a database 62 of member information services. A sixth choice is order entry 64.

Figure 2A:
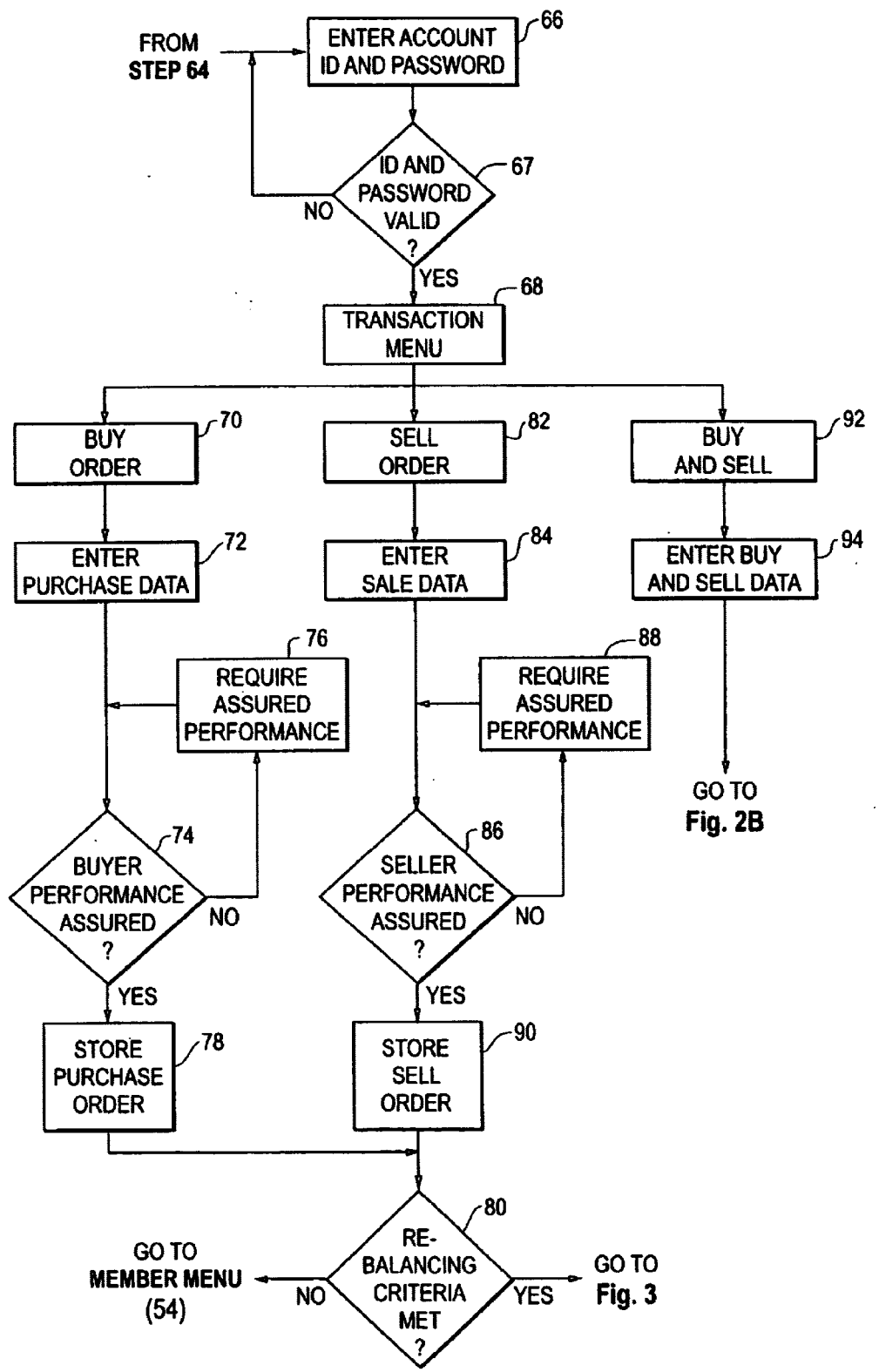
FIG. 2A is an illustration of a flow chart for an embodiment of the present invention.

Turning now to FIG. 2A, from step 64, the system 1 requires the client to enter 66 an account ID and password. The system 1 then determines 67 whether or not the account ID and password are valid. If no, the client is referred back to step 66. If yes, the client is referred to a transaction menu 68.

Figure 3B:
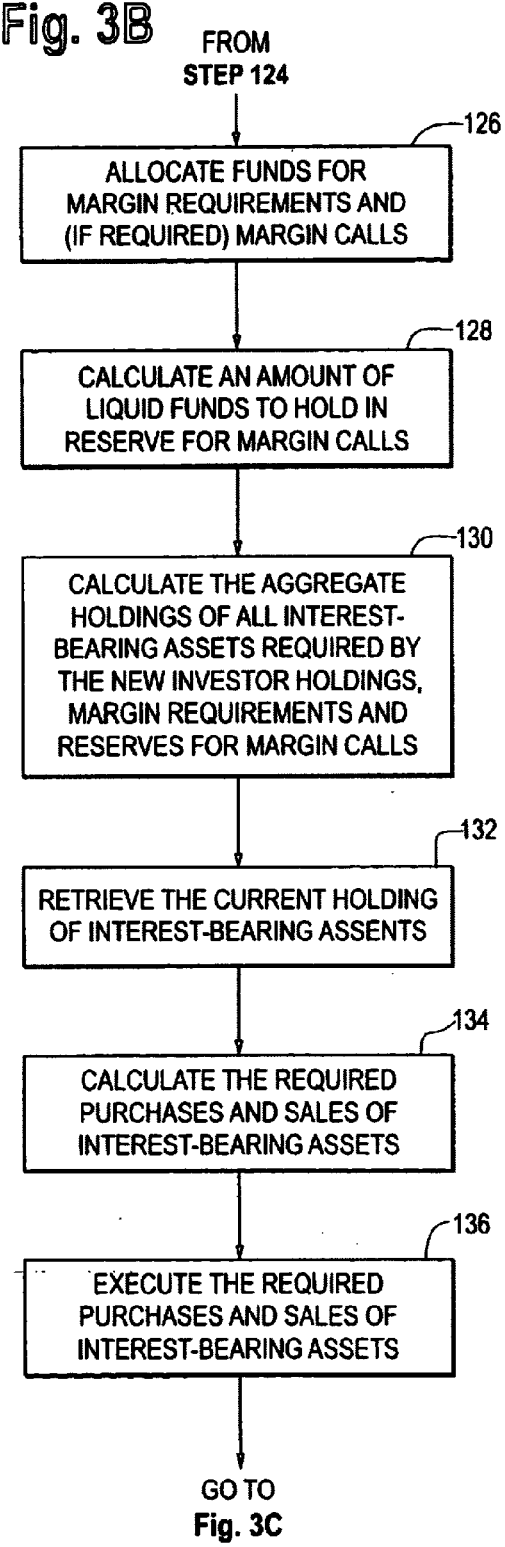
FIG. 3B is an illustration of a flow chart for an embodiment of the present invention.
Figure 3C:
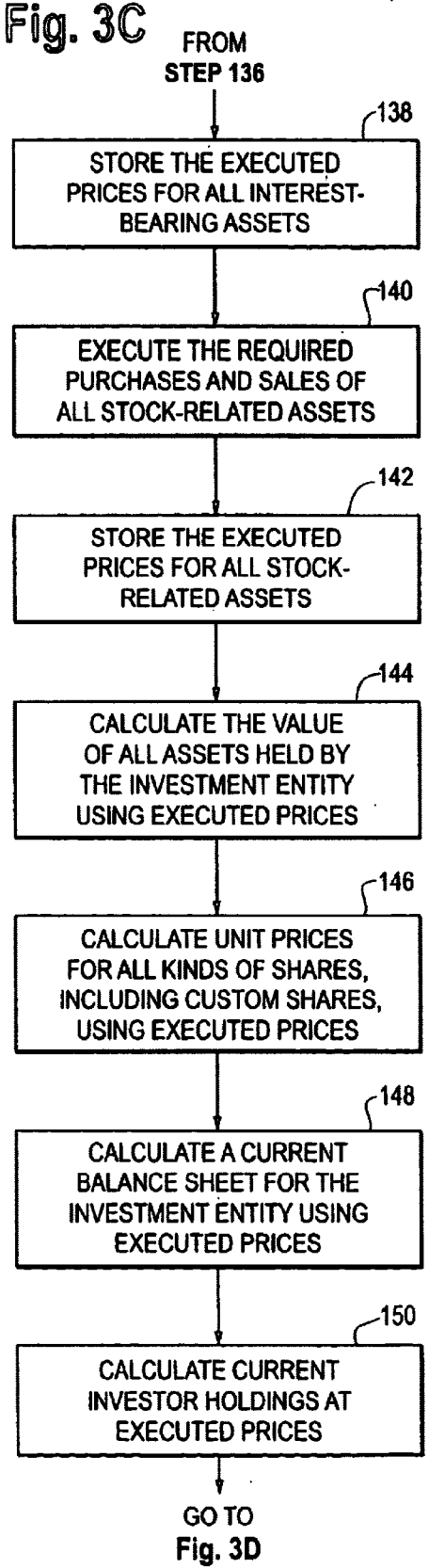
FIG. 3C is an illustration of a flow chart for an embodiment of the present invention.

One choice is a buy order 70. If the client chooses this option, the system 1 requests the client to enter 72 purchase data. The system 1 then determines 74 whether or not buyer performance is assured. If buyer performance is not assured, the system 1 will require 76 assured performance before proceeding. If buyer performance is assured, the system 1 stores 78 the purchase order. The system 1 then determines 78 whether or not rebalancing criteria are met. If the rebalancing criteria are met, go to FIG. 3. If the rebalancing criteria are not met, system 1 goes to the member menu 54.

A second choice is a sell order 82. If the client chooses this option, the system 1 requests the client to enter 84 sale data. The system 1 then determines 86 whether or not seller performance is assured. If seller performance is not assured, the system 1 will require 88 assured performance before proceeding. If seller performance is assured, go to step 80.

A third choice is buy and sell 92. If the client chooses this option, the system 1 requests the client to enter 94 buy and sell data, which leads to FIG. 2B.

Figure 2B:
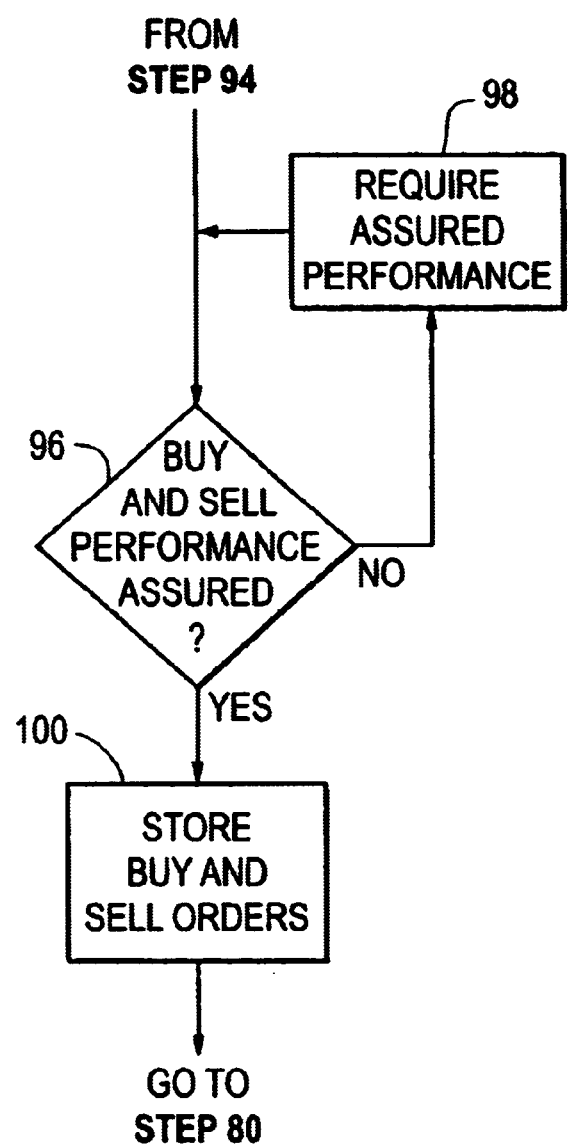
FIG. 2B is an illustration of a flow chart for an embodiment of the present invention.

Turning now to FIG. 2B, from step 94, the system 1 determines 96 whether or not buy and sell performance is assured. If buy and sell performance is not assured, the system 1 will require 98 assured performance before proceeding. If seller performance is assured, the system 1 stores 100 the buy and sell orders and goes to step 80.

Referring now to FIG. 3, upon a yes at step 80 the system 1 inputs 102 current price data on all stock-related instruments, inputs 104 current price data on all interest bearing instruments, inputs 106 current foreign exchange rates, retrieves 108 the mathematical relationships for all kinds of shares, including custom shares and calculates 110 unit values for all kinds of shares, including custom shares.

The system 1 the retrieves 112 all investor holdings from the previous rebalancing period, and inputs 114 buy and sell orders from fund managers. Going to FIG. 3A from step 114, the system 1 then retrieves 116 stored buy and sell orders and calculates 118 new investor holdings after executing all buy and sell orders.

The system 1 then calculates 120 the aggregate holdings of all stock-related assets required by the new investor holdings, retrieves 121 the current holdings of stock-related assets and calculates 122 the required purchases and sales of stock-related assets.

The system 1 then calculates 124 the margin requirements for the stock-related assets. Going to FIG. 3B from step 124, the system 1 allocates 126 funds for margin requirements and (if required) margin calls and calculates 128 the amount of liquid funds to hold in reserve for margin calls. The system 1 then calculates 130 the aggregate holdings of all interest-bearing assets required by the new investor holdings, margin requirements and reserves for margin calls. The system 1 then retrieves 132 the current holdings of all interest-bearing assets and calculates 134 the required purchases and sales of interest-bearing assets.

The system 1 then executes 136 the required purchases and sales of interest-bearing assets. Going to FIG. 3C from step 136, the system 1 then stores 138 the executed prices for all interest-bearing assets, executes 140 the required purchases and sales of all stock-related assets and stores 142 the executed prices for all stock-related assets. The system 1 then calculates 144 the value of all assets held by the investment entity using executed prices, calculates 146 unit prices for all kinds of shares, including custom shares, using executed prices, calculates 148 a current balance sheet for the investment entity using executed prices and calculates 150 current investor holdings at executed prices.

Figure 3D:
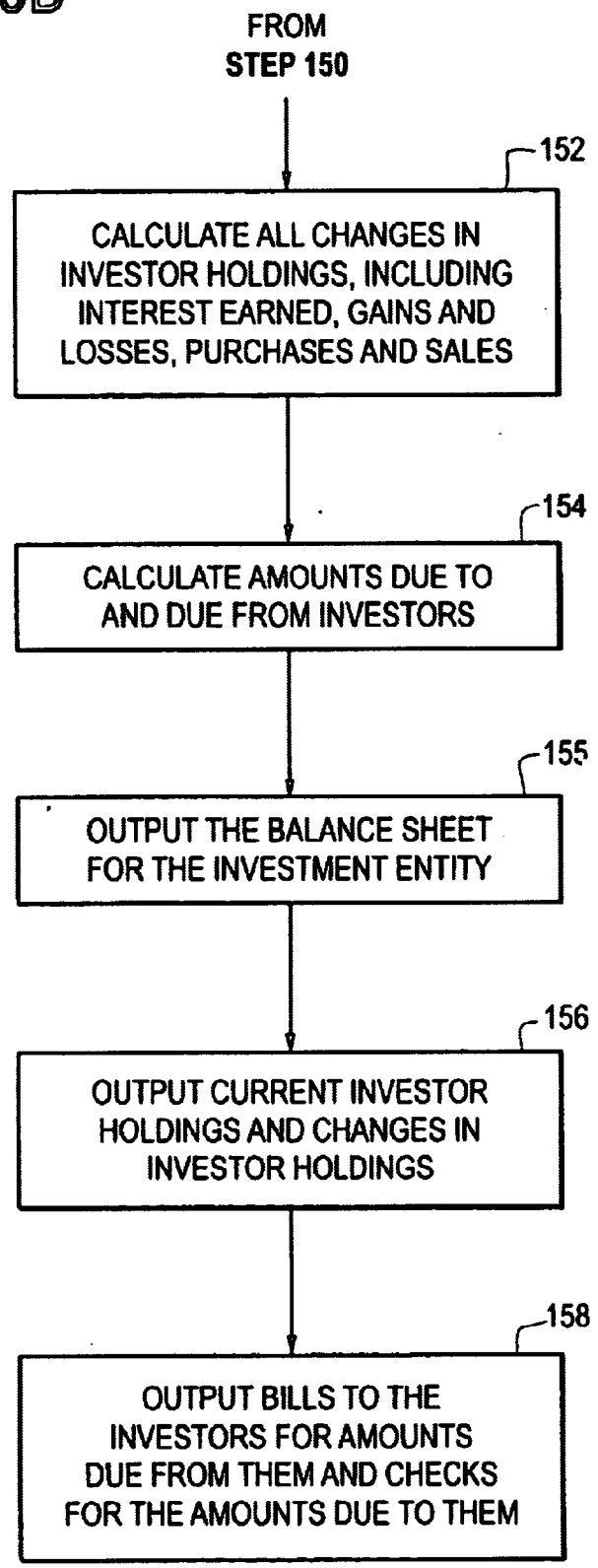
FIG. 3D is an illustration of a flow chart for an embodiment of the present invention.

Going to FIG. 3D from step 150, system 1 calculates 152 all changes in investor holdings, including interest earned, gains and losses, purchases and sales and calculates 154 amounts due to and due from investors. The system 1 then outputs 154 the balance sheet for the investment entity, outputs 156 current investor holdings and changes in holdings and outputs 158 bills to investors for amounts due from them and checks for amounts due to them.

In the preferred embodiment of the present invention described herein, clients are able to place share orders 2 electronically using their PCs 4 and communicating with the central processor computer of system 1 through the Internet 6. The ability to place orders electronically and to invest in a variety of types of shares, including shares that short market indexes and invest in index options, will enable individual investors to utilize the fund as a medium to cost-effectively implement their personal investment strategies, including timing the market, hedging and locking in principal amounts (fixed in purchasing power or nominal dollars) while participating in potential market upsides.

Therefore, the preferred embodiment of the present invention will provide attractive new investment alternatives to investors who wish to trade the market indexes in a cost-effective manner and/or implement their own custom risk management strategies. At the same time the present invention will create a lower cost, potentially higher-return alternative for investors who simply wish to buy and hold certain market indexes. However, the ability to place orders directly with the fund via computer and the Internet will be most valuable for those investors who wish to utilize the fund to trade market indexes in a cost-effective manner and/or implement their own custom risk management strategies.

As an additional component of this electronic network, the preferred embodiment of the present invention includes connecting the first digital electronic computer 12 of system 1 to a second digital electronic computer 28. This second digital electronic computer may be a trading computer, a broker's computer, a share owner's computer or a reporting agency's computer.

VI. We claim:

1. A computer-aided method for implementing a synthetic investment fund, having at least two different kinds of shares, the method including the step of:

forming the synthetic investment fund with a digital computer by entering data representing said at least two kinds of shares including an amount of an interest-bearing asset and an amount of a stock-related instrument, said amounts related by a mathematical relationship; and balancing, for each respective said kind of share, the amount of the interest-bearing asset and the amount of the stock-related instrument to maintain the mathematical relationship in response to input market price data corresponding respectively to the interest-bearing asset and to the stock-related instrument;

calculating, for each respertive said kind of share, unit values for said shares in the fund in response to the input market price data;

inputting, for each respective said kind of share, trade data to facilitate investors trading the shares in the fund;

accounting, for each respective said kind of share, for the trading, for changes in the market price data for the interest-bearing asset, and for the amount of the stock-related instrument, and for transactions involving the interest-bearing asset and transactions involving the stock-related asset; and generating, for each respective said kind of share, price data and holding data as output for reporting to said investors.

2. The method of claim 1, wherein the step of forming is carried out with the kinds reflecting a difference in type of interest-bearing asset.

3. The method of claim 1, wherein the step of forming is carried out with the kinds reflecting a difference in type of stock-related asset.

4. The method of claim 1, wherein the step of forming is carried out with the kinds reflecting a difference in the mathematical relationship for each of the kinds.

5. The method of claim 1, wherein the step of forming is carried out with customizable kinds of shares, the customizable kinds of shares defined from at least one member of a group consisting of the amount of the interest-bearing asset, the amount of the stock-related asset, and the mathematical relationship.

6. The method of claim 1, wherein the step of accounting for trading includes the steps of:

retrieving, for each respective said kind of share, holdings prior to a purchase of the shares; and generating, for each respective said kind of share, output representing the holdings adjusted for the purchase of the shares.

7. The method of claim 1, wherein the step of balancing is, for at least one of said kinds of shares, triggered periodically.

8. The method of claim 1, wherein the step of balancing is carried out with a non-United States debt instrument as the interest-bearing asset.

9. The method of claim 1, wherein the step of balancing is carried out with a government debt instrument as the interest-bearing asset.

10. The method of claim 1, wherein the step of balancing is carried out with a non-United States stock-related instrument as the stock-related instrument.

11. The method of claim 1, wherein the step of balancing is carried out with at least one member of the group consisting of a stock option and a stock index option as the stock-related instrument.

12. The method of claim 1, wherein the step of balancing is carried out with a stock index future as the stock-related instrument.

13. The method of claim 1, wherein the step of balancing is carried out with a swap as the interest-bearing asset.

14. The method of claim 1, further including the step of adjusting with said computer, for at least one of said kinds of shares, the mathematical relationship in response to changed market conditions.

15. The method of claim 1, wherein the step of accounting includes calculating margin requirements and allocating funds for margin calls for at least one of said kinds of shares.

16. The method of claim 1, further including the step of calculating, for at least one of said kinds of shares, an amount of liquid funds to hold in reserve for margin calls.

17. The method of claim 1, wherein the step of balancing includes, for at least one of said kinds of shares, adjusting futures contract holdings to reflect net changes in holdings of said kind of shares.

18. The method of claim 1, wherein the step of forming is carried out with at least some of said data representing foreign currency.

19. The method of claim 1, further including the step of managing, for at least one of said kinds of shares, short positions with said computer.

20. The method of claim 19, further including the step of managing, for at least one of said kinds of shares, long positions.

21. The method of claim 20, wherein the steps of managing include calculating, with said computer, for at least one of said kinds of shares, margin requirements on combined long and short positions.

22. The method of claim 7, wherein the step of balancing, for at least one of said kinds of shares, is carried out with a constant weighted-average maturity for the stock-related instrument.

23. The process of claim 1, further including:

inputting some of said output from said digital computer into a trading computer, said output including at least one of a group consisting of purchase orders and sell orders for at least one from a group consisting of an interest-bearing asset and a stock-related instrument;

computing a price for the asset; and generating output including trade confirmation documentation, including the price, for any trade of the asset.

24. The process of claim 1, further including:

inputting some of said output from said digital computer into a broker's computer, said output including at least one of a group consisting of respective purchase orders and sell orders for investments including at least one from a group consisting of interest-bearing assets and a stock related instruments; and responsive to a communication from the brokers computer, generating output including trade confirmation documentation, including a price, for a trade of the asset.

25. The process of claim 1, further including:

inputting a definition to said digital computer from a share owner's computer, said definition being a definition for at least one of said kinds of share, the definition including at least one from a group consisting of interest-bearing asset, the stock-related instrument and the mathematical relationship between the two;

inputting to said digital computer from a share owner's computer at least one from a group consisting of an amount of said kind of share and a price for said kind of share; and generating output including at least one from the group consisting of said kind of share and a price for said kind of share.

26. The process of claim 1, further including:

inputting some of said output as reporting input data from said digital computer into a reporting computer;

generating a reformatted version of the reporting input data;

communicating, by digital means, a transmission of the reformatted version of the reporting input data; and generating output at a recipient receiver device, the output including the reformatted version of the reporting input data.

27. The process of claim 3, further including:

inputting some of said output as reporting input data from said digital computer into a reporting computer;

generating a reformatted version of the reporting input data;

communicating, by digital means, a transmission of the reformatted version of the reporting input data; and generating output at a recipient receiver device, the output including the reformatted version of the reporting input data.

28. A computer-aided method for implementing at least one synthetic stock investment fund, the method including the steps of:

providing a digital electrical computer apparatus including a digital computer having a processor, the processor electrically connected to a memory device for storing and retrieving machine-readable signals, to an input device for converting information into input electrical data, and to an output device for converting output electrical data into print, the processor the processor operating a program controlling the apparatus in implementing at least one synthetic stock investment fund by steps including:

forming a synthetic stock investment fund, the synthetic stock fund forming carried out by steps including data including at least two kinds of interests and, for each of the respective kinds of interests, at least one from a group consisting of an amount of a stock-related asset, an amount of an interest-bearing asset and a mathematical relationship;

inputting market price data corresponding to at least one from the group consisting of the stock-related asset and the interest-bearing asset;

calculating values for each kind of interest in the fund in response to the input market data;

in putting trade data;

accounting for the trading, for changes in the market price data for at least one from the group consisting of the stock-related asset and the interest-bearing asset, and for transactions involving at least one from the group consisting of the stock-related asset and the interest-bearing asset; and generating interest price data and holding data as the output for investor reporting.

29. The method of claim 28, wherein the step of accounting for trading includes the steps of:

retrieving investor holdings prior to the trade; and, generating output representing the investor holdings adjusted for the trade.

30. The method of claim 29, wherein the step of forming includes different kinds of interest with different stock-related assets.

31. The method of claim 29, wherein the step of forming includes different kinds of interests with different interest-bearing assets.

32. The method of claim 29, wherein the step of forming includes different kinds of interests with different mathematical relationships.

33. The method of claim 29, wherein the step of forming includes the investor custom-creating his or her own variety of interest.

34. The method of claim 33, wherein the investor varies the nature of this custom interest over time.

35. The method of claim 29, wherein the step of forming includes a kind of interest managed by a professional manager.

36. The method of claim 29, wherein the step of inputting trade data includes inputting orders for fractional units.

37. The method of claim 29, wherein the step of inputting trade data includes calculating aggregated orders for stock-related assets.

38. The process of claim 29, further including:

providing an interest owner's digital electrical computer apparatus including an interest owner's digital computer having an interest owner's processor, the interest owner's processor electrically connected to an interest owner's memory device for storing and retrieving machine-readable signals, to an interest owner's input device for receiving interest owner's input data and converting the interest owner's input data into interest owner's input electrical data, and to a interest owner's output having a interest owner's visual presentation, the interest owner's processor being controlled by a interest owner's program to form interest owner's circuitry in the interest owner's processor for controlling the interest owner's apparatus to receive the interest owner's input data and to produce the interest owner's output data;

inputting, as a portion of the interest owner's input data, a specification for each kind of interest to be purchased;

inputting, as a further portion of the interest owner's input data, a purchase amount for each respective kind of interest; and generating output including purchase orders for each respective kind of interest.

* * * * *